United States Patent [19]

Tanaka

[11] Patent Number: 5,043,413

[45] Date of Patent: Aug. 27, 1991

[54] LOW BIREFRINGENCE POLYARYLATE FROM POLYARYLENE DICARBOXYLIC ACID AND POLYARYLENE DIPHENOL

[75] Inventor: Takumi Tanaka, Muko, Japan

[73] Assignee: Unitika Ltd., Hyogo, Japan

[21] Appl. No.: 513,816

[22] Filed: Apr. 25, 1990

[30] Foreign Application Priority Data

Apr. 28, 1989 [JP] Japan ................................ 1-109817

[51] Int. Cl.⁵ ...................... C08G 63/02; C08G 63/00; C08G 63/18; C08G 8/02
[52] U.S. Cl. ...................... 528/190; 528/176; 528/191; 528/125; 528/174; 528/193
[58] Field of Search ............... 528/125, 174, 176, 190, 528/191, 193

[56] References Cited

U.S. PATENT DOCUMENTS 3,284,405 11/1986 Coran .................................. 528/190

Primary Examiner—Harold D. Anderson
Assistant Examiner—T. Mosley
Attorney, Agent, or Firm—Wenderoth, Lind & Ponack

[57] ABSTRACT

An organic polyarylate containing a repeating unit represented by the formula;

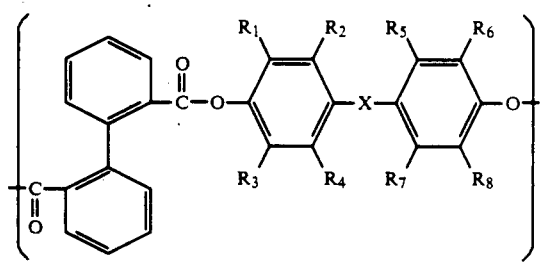

wherein X is at least one member selected from the group consisting of —O—, —S—, —SO$_2$—, —CO—, alkylene, alkenylene and following formulas;

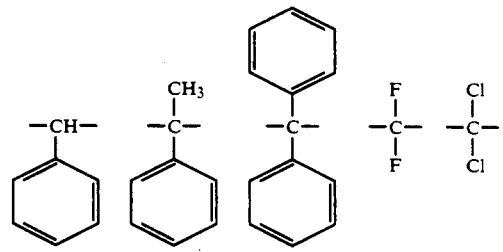

and $R_1$, $R_2$, $R_3$, $R_4$, $R_5$, $R_6$, and $R_7$ respectively show a hydrogen atom, a halogen atom or a $C_1$-$C_{10}$ alkyl group; said polyarylates having an inherent viscosity of at least 0.2 dl/g measured at 25° C. in a solution of 1 g of the polarylate in 100 ml of a mixture of 50% by weight of phenol and 50% by weight of 1,1,2,2-tetrachloroethane.

4 Claims, No Drawings

LOW BIREFRINGENCE POLYARYLATE FROM POLYARYLENE DICARBOXYLIC ACID AND POLYARYLENE DIPHENOL

FIELD OF THE INVENTION

The invention relates to organic polyarylates. Particularly, it relates to organic polyarylates having low birefringence under orientation and stress, high transparency and high deformation temperature so that can be successfully used in the optical field.

BACKGROUND OF THE INVENTION

Resins which have good transparency and mechanical properties are usually employed in the optical field. The resins are subjected to a thermoforming process, such as injection molding to form suitable shape products. The products, however, have a large birefringence due to molecular orientation and stress which occur in the thermoforming process.

SUMMARY OF THE INVENTION

This invention dissolves the above problem and provide polyarylates which have low birefringence under orientation and stress, good transparency and high heat deformation temperature.

The polyarylates of the invention are organic, high molecular weight polyarylates containing a repeating unit represented by the formula;

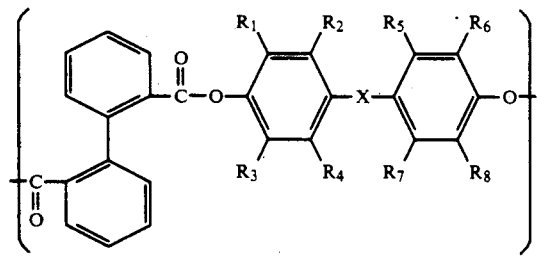

wherein X is at least one member selected from the group consisting of —O—, —S—, —SO$_2$—, —CO—, alkylene, alkenylene and following formulas;

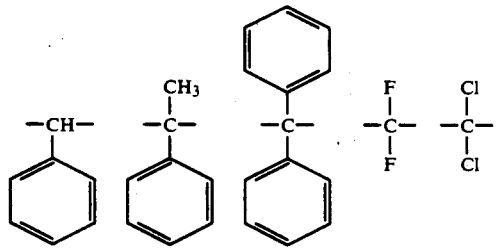

and $R_1$, $R_2$, $R_3$, $R_4$, $R_5$, $R_6$, and $R_7$ respectively show a hydrogen atom, a halogen atom or a $C_1$-$C_{10}$ alkyl group; said polyarylates having an inherent viscosity of at least 0.2 dl/g measured at 25° C. in a solution of 1 g of the polyarylate in 100 ml of a mixture of 50% by weight of phenol and 50% by weight of 1,1,2,2-tetrachloroethane.

Polyarylates of the invention have very low birefringence after molding or drawing as films or fibers and have superior transparency. The heat deformation temperature is also high.

The novel polyarylates can be used as an engineering plastics and especially in the optical field, such as optical disks, optical lens and optical fibers and so on.

DETAILED DESCRIPTION OF THE INVENTION

The polyarylates of the invention are organic, high molecular weight polyarylates containing a repeating unit represented by the formula;

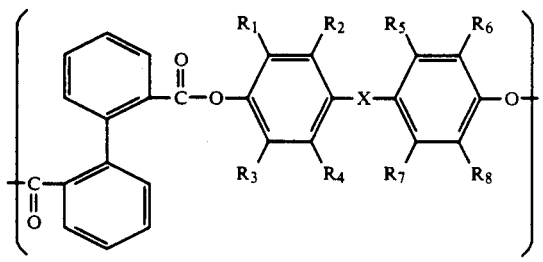

wherein X is at least one member selected from the group consisting of —O—, —S—, —SO$_2$—, —CO—, alkylene, alkenylene and following formulas;

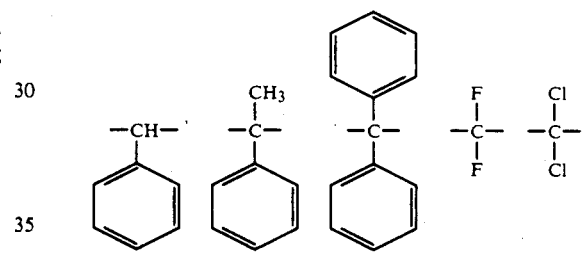

and $R_1$, $R_2$, $R_3$, $R_4$, $R_5$, $R_6$, and $R_7$ respectively show a hydrogen atom, a halogen atom or a $C_1$-$C_{10}$ alkyl group; said polyarylates having an inherent viscosity of at least 0.2 dl/g measured at 25 ° C in a solution of 1 g of the polarylate in 100 ml of a mixture of 50% by weight of phenol and 50% by weight of 1,1,2,2-tetrachloroethane.

The polyarylates of the invention are prepared from 2,2'-dicarboxybiphenyl and bisphenols. Examples of the bisphenols are 2,2-bis(4-hydroxyphenyl)-propane, 2,2-bis(4-hydroxy-3,5-dibromophenyl)-propane, 2,2-bis(4-hydroxy-3,5-dichlorophenyl)-propane, 4,4'-dihydroxydiphenylsulfone, 4,4'-dihydorxydiphenyl ether, 4,4'-dihydroxydiphenylsulfide, 4,4'-dihydorxydiphenyl ketone, 4,4'-dihydroxydiphenylmethane, 2,2-bis(4-hydroxy-3,5-dimethylphenyl)-propane, 1,1-bis(4-hydroxyphenyl)-ethane, 1,1-bis(4-hydroxyphenyl)-cyclohexane, 4,4'-dihydroxydiphenyl-methyl-isobuthyl-methane, 2,2-bis(4-hydroxyphenyl)-diphenylmethane, 2,2-bis(4-hydroxyphenyl)difluoromethane and 2,2-bis(4-hydroxyphenyl)dichloromethane. Preferred are 2,2-bis(4-hydroxy phenyl)propane, 2,2-bis(4-hydroxyphenyl)-phenylethane and 4,4'-dihydroxydiphenyl ether. More than two kinds of the bisphenols can be used for the polymerization.

Polyarylates of the invention can be polymerized by conventional methods, for example (1) an interfacial polymerization in which an alkali-solution of the bisphenols and a solution of biphenyl 2,2'-dicarboxyl chloride in an organic solvent incompatible with water are mixed to polymerize; (2) a solution polymerization in which the bisphenyls and biphenyl 2,2'-dicarboxy chloride are heated in an organic solvent; and (3) a melt polymerization in which phenyl ester of 2,2'-dicarboxy biphenyl and the bisphenols are mixed and heated In case of the interfacial polymerization, the solution of biphenyl 2,2'-dicarboxylchloride in 1,2-dichloroethane is added into an aqueous sodium hydoride solution of bisphenols and polyemerized with stirring at 5°-25° C. for 5 minutes to 5 hours.

The polyarylates of the present invention have an inherent viscosity of at least 0.2 dl/g, preferably in the range from 0.4 dl/g to 0.8 dl/g measured at 25° C. in a solution of 1.0 g of the polyarylates in 100 ml of a mixture of 50% by weight of phenol and 50% by weight of 1,1,2,2-tetra-chloroethane.

When polyarylates have an inherent viscosity of less than 0.2, mechanical properties are poor. Molecular weight control reagent is preferably used in order to obtain an appropriate inherent viscosity. An monovalent phenol compound is usually used as a molecular weight control reagent, such as o-phenyl phenol, β-naphtol and so on. In polymerization, the molecular weight control reagent is used an aqueous sodium hydroside solution with the bisphenols. The molecular weight control reagent is used in an amount of 1 to 3 mole % of the amount of the bisphenols.

The polyarylates of the present invention is amorphous so that they have good transparency, low birefringence under orientation and stress and high heat deformation temperature.

EXAMPLE

The present invention is illustrated by the following examples which, however, are not to be construed as limiting to their details.

In the following examples the methods for measuring birefringences and glass transition temperatures are as follows;

(1) birefringence

NIKON OPTIPHOTO-POL (a polarized microscope equipped with SENALMON conpensator available from Nippon Kogaku K.K.) was used for the measurements of birefringences.

(2) glass transition temperature

The measurements were carried out using DSC-2 differential scanning calorie meter available from PARKIN ELMER COMPANY in a nitrogen atmosphere after heating up to 300° C. and cooling down to room temperature. The heating rate of the measurements was 20° C./min.

EXAMPLE 1

1,2-Dichloroethane was added to 0.15 mole of biphenyl 2,2'-dicarboxychloride to form a 6 wt % solution of the chloride. 0.15 Mole of 2,2-bis(4-hydroxyphenyl)-propane was dissloved in 4N aqueous sodium hydoride solution of sufficient amount to form a 6 wt % solution, to which 0.4 g of p-tert-butylphenol and 0.17 g of trimethylammoniumchloride were added dropwise Keeping this alkali solution at about 10° C. with vigorous stirring, the former solution was added at once and polymerized for about 4 hours. After the polymerization, the solution was neutralized with acetic acid and the oil phase was fractionated. A large amount of acetone was added in the fractionated oil phase and the polymer precipitate was obtained. A peak around 1740 cm$^{-1}$ was seen in FT-IR spectrum measurement of the polymer, which is intrinsic for ester linkage. The inherent viscosity of the polymer was 0.7 dl/g measured at 25° C. in a solution of 1 g of the polymer in 100 ml of a mixture of 50% phenol by weight and 50% 1,1,2,2-tetrachloroethane by weight. The glass transition temperature of the polymer was 163° C.

EXAMPLE 2

Using 2,2-bis(4-hydroxyphenyl)-phenylethane, the polymerization was carried out by the same method as Example 1. A peak which is common to ester linkage around 1740 cm$^{-1}$ was seen in FT-IR spectrum. The inherent viscosity of the polymer was 0.6 dl/g in the same condition as Example 1. The glass transition temperature was 190° C.

EXAMPLE 3

Using 4,4'-dihydroxydiphenylether, the polymerization was carried out with the same method as Example 1. A peak which is common to ester linkage around 1740 cm$^{-1}$ was seen in FT-IR spectrum. The inherent viscosity of the polymer was 0.66 dl/g in the same condition as Example 1. The glass transition temperature was 176° C.

COMPARATIVE EXAMPLE 1

A polyarylate consisting of equimolar of terephthalic and isophthalic acid and 2,2-bis(4-hydroxyphenyl)-propane was commercially obtained. The inherent viscosity of the polymer is 0.7 and the glass transition temperature is 194° C.

Films of polyarylates from Examples 1, 2, 3 and Comparative Example 1 were prepared by a casting method from 10% by weight of solutions of polyarylates in 1,2-dichloroethane. The films were drawn with 20% of the strain at 20 degree higher temperatures than the glass transition temperatures of the polyarylates and quenched in the water bath.

Birefringences of the drawn films were measured and summarized in the table as well as the glass transition temperatures.

TABLE

| | Glass transition temperature (°C.) | Birefringence |
|---|---|---|
| Example 1 | 163 | $20.5 \times 10^{-5}$ |
| Example 2 | 190 | $9.5 \times 10^{-5}$ |
| Example 3 | 176 | $25.7 \times 10^{-5}$ |
| Comparative Example 1 | 194 | $2710 \times 10^{-5}$ |

What is claimed is:

1. An organic polyarylate containing a repeating unit represented by the formula;

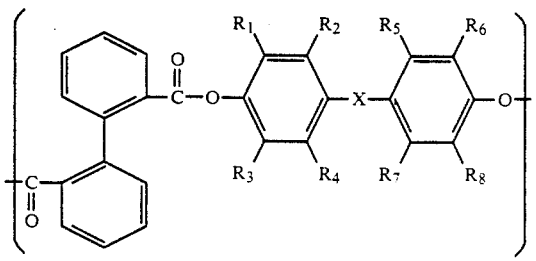

wherein X is at least one member selected from the group consisting of —O—, —S—, —SO₂—, —CO—, alkylene, alkenylene and following formulas;

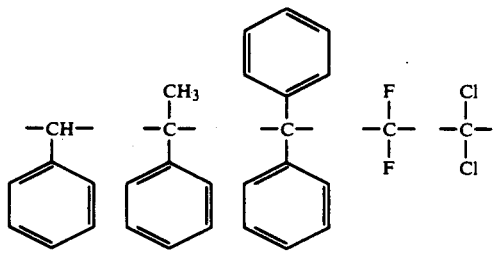

and $R_1$, $R_2$, $R_3$, $R_4$, $R_5$, $R_6$, and $R_7$ respectively represent a hydrogen atom, a halogen atom or a $C_1$-$C_{10}$ alkyl group; said polyarylate having an inherent viscosity of at least 0.2 dl/g measured at 25° C. in a solution of 1 g of the polarylate in 100 ml of a mixture of 50% by weight of phenol and 50% by weight of 1,1,2,2-tetrachloroethane.

2. The organic polyacrylate according to claim 1 wherein said polyarylate is prepared by polymerizing 2,2'-dicarboxybiphenyl and at least one bisphenol.

3. The organic polyarylate according to claim 2 wherein said at least one bisphenol is 2,2-bis(4-hydroxyphenyl)propane, 2,2-bis(4-hydroxyphenyl)-phenylethane or 4,4'-dihydroxydiphenyl ether.

4. The organic polyarylate according to claim 2 wherein said polymerization is conducted in the presence of a molecular weight control reagent.

* * * * *